Aug. 9, 1966  R. W. SWORDS  3,264,906
MACHINE TOOL SPINDLE ASSEMBLY
Filed July 16, 1964  2 Sheets-Sheet 1

Inventor
Robert W. Swords
By McCanna, Morsbach & Pirote
Attorneys

Aug. 9, 1966  R. W. SWORDS  3,264,906
MACHINE TOOL SPINDLE ASSEMBLY
Filed July 16, 1964  2 Sheets-Sheet 2
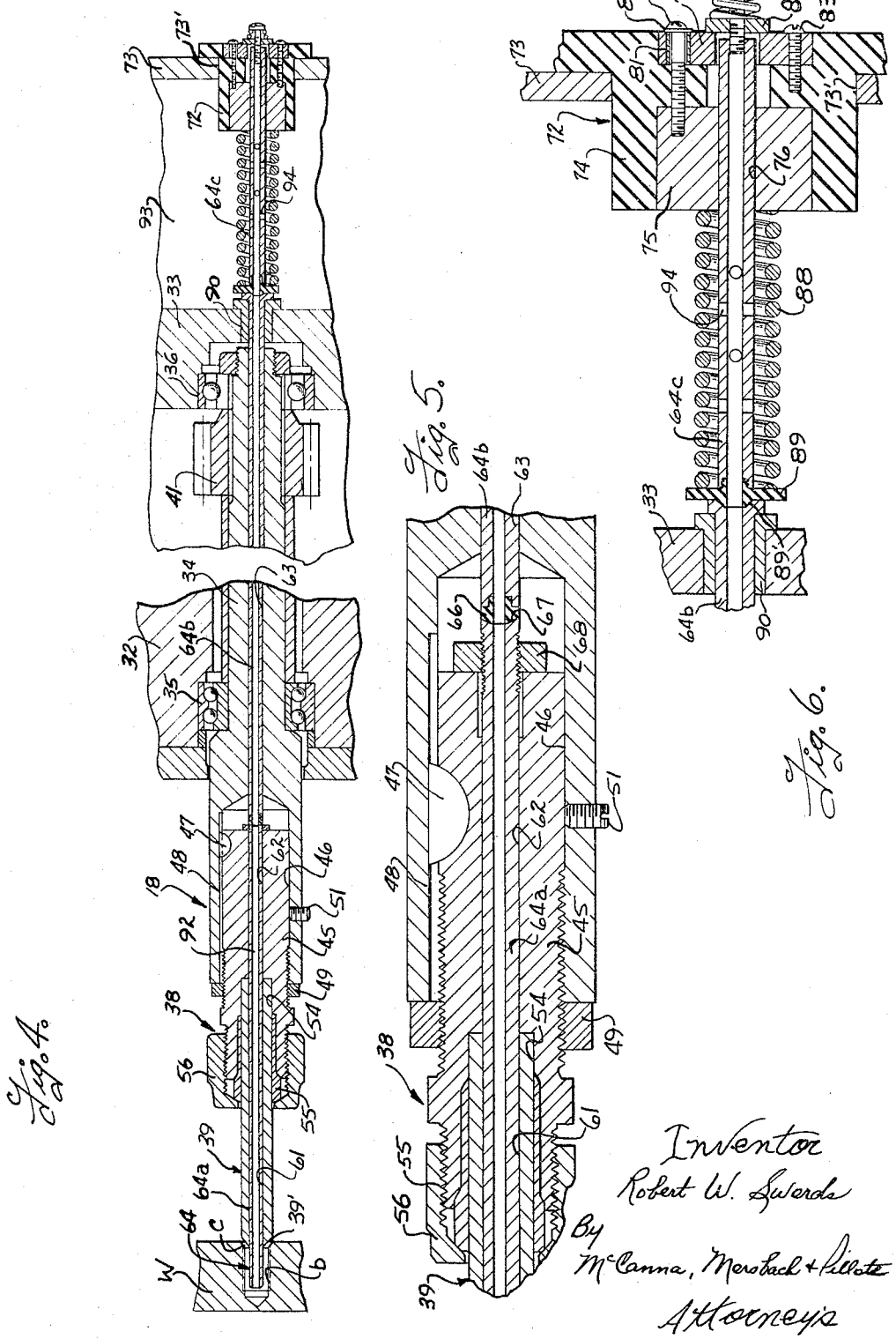

United States Patent Office 3,264,906
Patented August 9, 1966

3,264,906
MACHINE TOOL SPINDLE ASSEMBLY
Robert W. Swords, 2912 Rural St., Rockford, Ill.
Filed July 16, 1964, Ser. No. 383,189
14 Claims. (Cl. 77—5)

This invention relates to machine tools and particularly to a spindle assembly for a machine tool.

In machine tools of the type wherein a workpiece is successively presented to different cutting tools, it is necessary or at least highly desirable to provide a means for testing whether certain previous machining operations have been properly performed. Thus, in order to determine whether a hole has been properly drilled or whether a drill has broken off in the hole, it is common practice to provide a separate probing station for probing the holes in a workpiece.

An important object of this invention is to provide a machine tool in which the probing operation is performed at a cutting station to reduce the overall size of the machine tool.

Another object of this invention is to provide a combined probe, blow out and chamfering spindle which combines the multiple functions of probing, blowing out chips, and chamfering at a single station.

Another object of this invention is to provide a tool carrying spindle assembly in which a probe apparatus is mounted on the spindle assembly and extends through the end of the cutting tool to probe the workpiece in advance of the cutting tool and in response to movement of the spindle toward the workpiece.

A further object of this invention is to provide a tool carrying spindle in which a probe tube is mounted on the spindle and extends through the end of the cutting tool and operates to direct fluid into the hole in which the cutting tool is to perform its operation.

Still another object of this invention is to provide a combined probe, blow out and chamfering spindle in which the probe extends through the spindle and cutting tool and has a novel arrangement which facilitates sharpening or replacement of the cutting tool.

These, together with other objects and advantages of this invention will be more readily appreciated as the same becomes better understood by reference to the following detailed description when taken in connection with the accompanying drawings wherein:

FIG. 4 is a longitudinal sectional view through a combination probe, blow out and chamfering spindle;

FIG. 5 is an enlarged fragmentary sectional view of the tool holding end of the spindle; and FIG. 6 is an enlarged fragmentary sectional view of the switch means operated by the probe.

Figure 1:
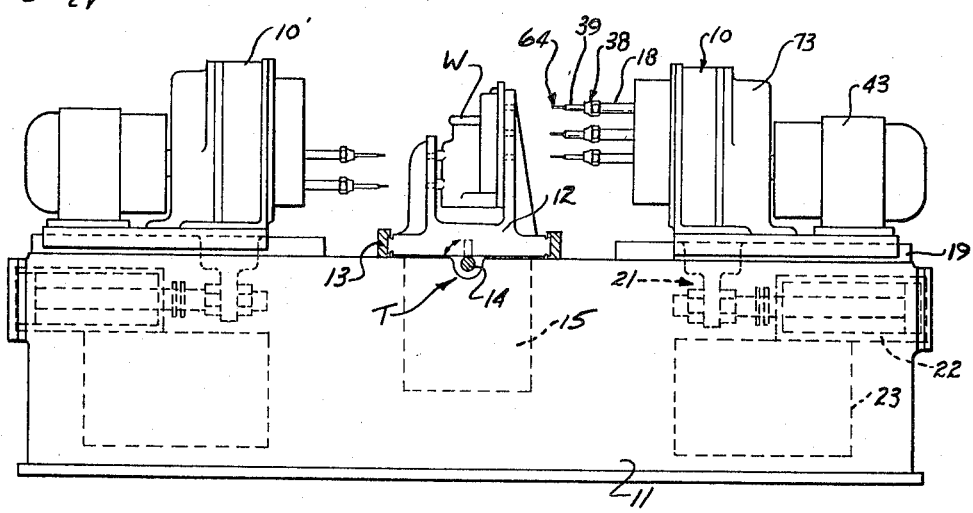
FIG. 1 is an elevational view of a machine tool embodying the improved spindle assembly of the present invention.

By way of illustration, the combination spindle assembly and probe of the present invention is illustrated in FIG. 1 applied to a machine tool having a plurality of tool heads designated 10 and 10' mounted on a base 11, it being apparent that the invention can also be employed with machines having a single tool head. The tool heads are arranged to perform certain cutting operations on a workpiece W as it is advanced past the tool heads and, as shown, the workpiece is supported in a work carrier 12 which is guidably supported and advanced by a transfer mechanism T including guideways 13 and the carrier advancing mechanism 14. A drive mechanism 15 is provided for operating the advancing mechanism 14 to advance the carriers in step fashion past the tool heads.

The tool heads 10 and 10' each include one or more spindles designated 18 and apparatus is provided for effecting relative movement between the spindle assembly and the workpiece along a path generally axially of the spindle. As shown, the tool heads are supported in guideways 19 for sliding movement along a path lengthwise of the spindles toward and away from the workpiece and a spindle feed mechanism 21 is provided for causing relative movement between the tool head and the workpiece through the desired distance and in proper timed relation with the transfer mechanism. In the form shown, the spindle feed mechanism is of the type having a fluid operator 22 and a control mechanism 23 for supplying and controlling the flows of fluid to the operator 22 to reciprocate the tool head through the desired stroke and in proper-timed relation with the transfer mechanism.

Figure 2:
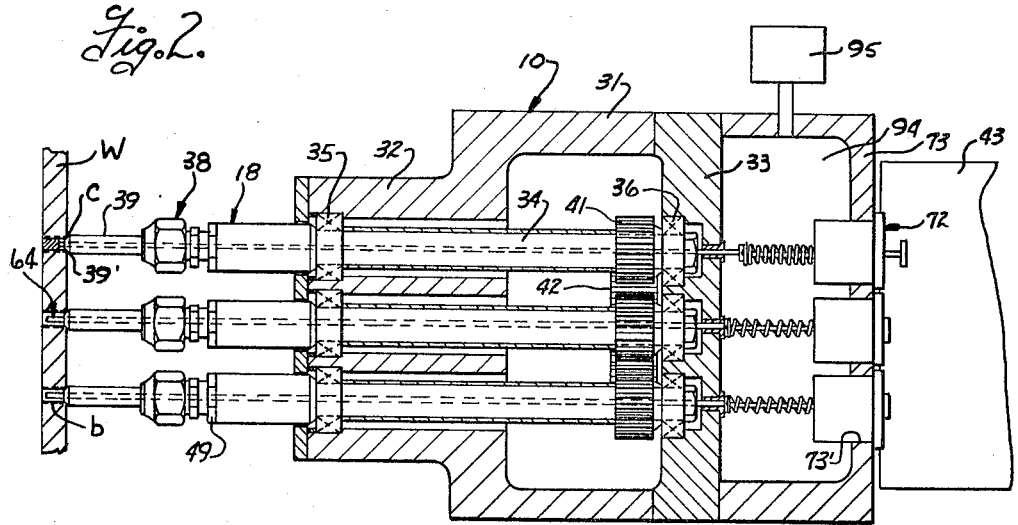
FIG. 2 is a sectional view through a multiple spindle tool head.

The tool heads 10 and 10' may be of similar construction and only one is herein specifically illustrated and described. The tool head 10 includes a gear case 31 having a spindle assembly supporting structure 32 at one end and a wall 33 at the other end. The spindle assembly includes an elongated spindle body 34 which is rotatably supported as by bearings 35 and 36 in the support structure 32 and wall 33. The spindle body extends out of the tool head and has a tool holding means 38 at the outer end thereof for mounting a cutting tool 39 on the spindle for rotation therewith. These spindles are rotated about their axes to turn the cutting tool and, as shown, have gears 41 non-rotatably splined thereto, and which gears 41 are drivingly connected through a gear or gears 42 (FIG. 2) to a spindle drive motor 43.

The tool holding means 38 for mounting the tool 39 on the spindle may be of any suitable construction and, as shown, the tool holding means includes a tool holder 45 which is non-rotatably keyed in a socket 46 in the spindle, as by a key 47 and keyway 48. An adjustable stop 49 is threaded on the tool holder and engages the end of the spindle to adjustably support the tool holder on the spindle. A means such as a set screw 51 (FIG. 4) may be provided to releasably retain the tool holder in the spindle. The tool holder 45 shown herein is of the collet type having a socket 54 for receiving one end of the tool, jaws 55 and clamp ring 56 for clamping the tool in the socket. Alternatively, any other conventional tool holder may be employed, if desired.

The tools 39 are preferably chamfering tools for forming chamfers indicated at c around the bores or holes b in the workpiece W. For this purpose, the chamfering tools 39 are formed with appropriately shaped cutting faces 39' at their outer ends. The spindle assembly is so arranged as to probe the bores or holes in the workpiece W to detect whether the holes are properly formed or whether an obstruction such as a broken drill bit remains in the hole. For this purpose, the cutting tool 39, tool holder 45 and spindle body 34 are formed with preferably aligned passages 61, 62 and 63 which extend axially through the cutting tool, tool holder and spindle. A probe element designated generally by the numeral 64 is slidably disposed in the aforementioned passages 61–63 and has a tip portion extending outwardly from the end of the cutting tool 39. While the probe element may be formed in one piece, it is preferably formed in multiple sections, herein shown three in number and designated 64a, 64b and 64c. The section 64b is slidably supported in the spindle 34 for rotation therewith and the section 64a is slidably disposed in the tool holder 45 and tool 39 for rotation therewith. The probe sections 64a and 64b are detachably connected together at a joint located adjacent the inner end of the tool holder, to facilitate removal of the tool holder for grinding or replacement. As best shown in FIG. 5, the probe section 64b has a preferably resilient sealing head 66 on the end which engages a seat 67 on the end of the section 64a. It is necessary to adjust the position of the tool holder 45 on the spindle, each time the cutting tool 39 is ground, to maintain a preselected spacing between the tip 39' of the cutting tool and the spindle, and provision is also made for adjusting the probe section 64a relative to the tool holder and tool to maintain a preselected projection of the probe element from the cutting face 39'. As shown, an adjustable stop 68 is threaded on the probe section 64a and engages the inner end of the tool holder to adjustably position the probe element with respect to the tool holder. If desired, the probe section 64a can be further subdivided at a point adjacent the inner end of the cutting tool 39, if desired.

As will be seen, the probe element 64 will move with the spindle assembly and cutting tool as the spindle assembly is advanced toward the workpiece and, if the bore b is properly formed and located, the probe element will enter the bore and there will be no axial movement of the probe element relative to the cutting tool and spindle. However, if the bore is not properly formed or if there is an obstruction such as a broken drill bit in the bore, the probe element will engage the obstruction and will shift the probe element rearwardly relative to the cutting tool and spindle. A means is provided for detecting relative axial movement between the probe element and cutting tool. In the preferred embodiment illustrated, an electrical switch mechanism 72 is provided for detecting relative axial movement between the cutting tool and probe, it being understood that a fluid switch or valve may be employed for this purpose and operatively connected to the probe for actuation in response to movement of the probe. As best shown in FIGS. 4 and 6, the switch means 72 is mounted on a casing 73 attached to the tool head for movement therewith. The switch means includes a body 74 preferably formed of a dielectric material which is mounted in an opening 73 in the casing 73 in approximate alignment with the spindle. A block 75 of electrically conductive material is mounted on the body 74 and has a bore 76 which slidably and preferably non-rotatably supports the probe sections 64c. Any suitable means (not shown) may be provided for inhibiting relative rotation between the probe section 64c and the block 75 and the probe may, for example, be formed with a non-circular cross section or a key means which fits a corresponding keyway in the block. The probe section 64c is also preferably formed of an electrically conductive material which has a sliding electrical contact with the block 75 and a contact member 78 mounted on the body 74 in spaced relation to the block. One connector terminal 79 extends through the contact 78 and is insulated therefrom as by insulating bushings and washers 81 and 82, the terminal 79 extending into the conducting block 75 to form a connector terminal therefor. A second connector terminal 83 is threaded into the body 74 and is disposed in electrically conductive relation with the contact 78. A switch blade 84 is mounted on the probe section 64c for movement into and out of engagement with the contact 78. In the form shown, the switch means is of the normally closed type and the switch blade 84 engages the contact 78 when the probe element is in its normal position projecting beyond the end of the cutting tool, it being understood that the switch means could be arranged so as to be normally open. The switch blade is preferably connected to the probe section through a lost motion connection including a fastener 85 and spring 86 which allows limited overtravel of the probe element. As will be seen, as the probe element moves to the right as viewed in FIG. 6, the end of the probe element engages the switch plate and moves it away from the contacts 78 to open the circuit between terminals 79 and 83.

A compression spring 88 is provided for yieldably urging the probe element outwardly of the cutting tool and, conveniently, the spring is interposed between the switch means 72 and a collar 89 on the probe section 64c. The collar 89 may conveniently be formed of a wear resistant or bearing type material and has a face 89' shaped to cooperate with a seat on the end of the probe section 64b, to form a rotary seal connection between the probe sections 64c and 64b. As previously noted, the probe section 64b rotates with the spindle while the section 64c is stationary and the aforementioned connection permits relative rotation between the probe sections while enabling the probe sections to move axially in unison. A gland 90 is preferably provided in the casing wall 33 to rotatably support the probe section 64b.

The probe element is also preferably employed to pass fluid such as air into the bores or holes in the workpiece to blow out the bores. As shown, the probe element including sections 64a–64c are of tubular form to define an air passage 92 extending lengthwise through the probe element. Air is supplied to the passage 92 at a point remote from the end of the probe that projects into the hole in the workpiece. Advantageously, the casing 73 on the tool head may be arranged to form an air chest designated 93. Lateral passages 94 are formed in the probe section 64c and communicate with the lengthwise passage 92 to pass air from the air chest through the probe. Any suitable means may be provided for supplying pressurized air to the air chest as diagrammatically shown at 95 in FIG. 2.

Figure 3:
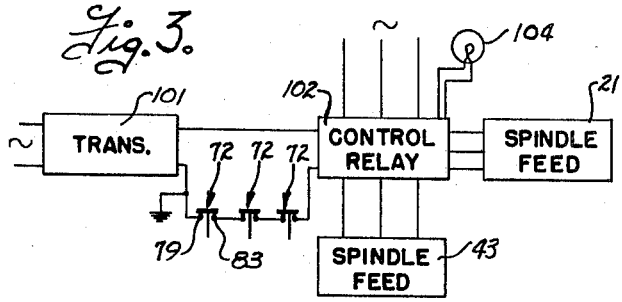
FIG. 3 is a diagrammatic view illustrating a probe actuated control system for the machine tool.

The switch means 72 which is actuated by the probe 64, is arranged to operate a machine control means. As diagrammatically shown in FIG. 3, the switch means 72 are connected to a low voltage supply source, conveniently obtained from a transformer 101. The switch means is arranged to operate a control relay 102 or the like, which control relay in turn is arranged to control the operation of the spindle feed 21 and/or the spindle drive 43. An indicator means such as a lamp 104 may be provided to indicate when the probe strikes an obstruction, and if desired, the control relay can be so arranged as to also stop the transfer mechanism drive apparatus 15. When a plurality of spindles are employed having plural probe elements, the switches 72 of the several probe elements can conveniently be connected so that operation of any one of the switches will correspondingly control the machine. As shown in FIG. 5, the normally closed type switches 72 are connected in series with each other and with the control relay 102. While the control relay is herein shown arranged to interrupt supply of power to the spindle drive and spindle feed, it is to be understood that different types of controls may be employed which are operated by the switch means to control one or more operations of the machine. As is deemed apparent, the manner in which the control mechanism operates to control the machine will vary with different types of machines having different types of spindle feed and spindle drive mechanisms.

From the foregoing, it is thought that the construction and operation of the combination chamfer spindle, probe and blow out apparatus, will be readily understood. Since the probing and blow out are both accomplished at the chamfering station, it is unnecessary to provide a separate station for probing and blowing out holes in the workpiece, with a consequent reduction in the overall size and complexity of the machine. As will be seen, the spindle feed mechanism also moves the probe and blow out tube into and out of the holes in the workpiece. If the bore is properly formed, the probe will enter the workpiece and there will be no relative axial movement between the probe and cutting tool, and the switch will remain in its normal position. However, if the bore is not properly formed or if there is an obstruction such as a broken drill bit in the bore, the probe will engage the obstruction before the chamfering tool engages the workpiece and the probe will be moved axially relative to the cutting tool to actuate the switch 72. As previously described, the switch 72, when actuated, will operate an indicator device 104 or control the machine tool, or both, as previously described. Since the probe also functions as a blow out tube, it will be seen that air is directed into the bore $b$ as the chamfering tool approaches the bore and also during the chamfering operation and while the tool is being retracted so as to completely remove chips and other foreign matter from the hole. When the probe tube is formed in multiple sections as described, the cutting tool and tool holder can be easily removed and replaced on the spindle without removing the entire probe tube.

I claim:

1. In a machine tool including a spindle assembly and means for effecting relative movement between the spindle assembly and a workpiece along a path generally axially of the spindle, the spindle assembly including a rotatable tool holding spindle and a cutting tool carried by the spindle, means for rotating the spindle about its axis, the tool having a lengthwise passage therein, a probe element extending through said passage in the tool and having one end projecting outwardly of the outer end of the tool, said probe element being axially slidable relative to said tool, and machine control means operated in response to relative axial movement between the tool and probe element.

2. In a machine tool including a spindle assembly and means for effecting relative movement between the spindle assembly and a workpiece along a path generally axially of the spindle, the spindle assembly including a rotatable tool holding spindle and a cutting tool carried by the spindle, means for rotating the spindle about its axis, the tool having a lengthwise passage therein, a tubular probe element extending through said passage in the tool and outwardly of the outer end of the latter, said tubular element being axially slidable relative to said tool, means for passing fluid through the tube, and machine control means operated in response to relative axial movement between the tool and probe element.

3. In a machine tool including a spindle assembly and means for effecting relative movement between the spindle assembly and a workpiece along a path generally axially of the spindle, the spindle assembly including a rotatable tool holding spindle and a cutting tool carried by the spindle, means for rotating the spindle about its axis, the tool having a lengthwise passage therein, tubular element extending through said passage in the tool and outwardly of the outer end of the latter, said tubular element being axially slidable relative to the tube, and means for passing fluid through the tube.

4. In a machine tool including a spindle assembly and means for effecting relative movement between the spindle assembly and a workpiece along a path generally axially of the spindle, the spindle assembly including a rotatable tool holding spindle and a cutting tool carried by the spindle, the spindle and tool having lengthwise passages therein, a probe element extending through said passages in the spindle and tool and having an end projection outwardly of the outer end of the tool, the probe element being axially slidable relative to said tool and spindle, and switch means operatively connected to said probe element for operation thereby in response to relative axial movement between the tool and probe element.

5. The combination of claim 4 wherein said probe element includes at least several axially aligned sections, one of the sections extending through the tool and being detachable from the remainder of the probe element to facilitate replacement of the tool.

6. The combination of claim 4 wherein said probe element is tubular, and an air supply means communicating with said probe element at a point remote from said tool for passing air through the probe element and out through said one end of the probe element.

7. A spindle assembly for a machine tool including a rotary spindle having tool holding means at one end and a cutting tool carried by said tool holding means, the spindle and tool holding means and tool having lengthwise passages extending therethrough, a probe element slidable in said passages and having one end extending outwardly of the outer end of the cutting tool, and switch means operatively connected to said probe element for operation thereby in response to relative axial movement between the tool and probe element.

8. A spindle assembly for a machine tool including a rotary spindle having tool holding means at one end and a cutting tool carried by said tool holding means, the spindle and tool holding means and tool having lengthwise passages extending therethrough, a probe element slidable in said passages and having one end extending outwardly of the outer end of the cutting tool, and switch means operatively connected to said probe element for operation thereby in response to relative axial movement between the tool and probe element, said probe element including a first section that rotates with the spindle and a second section which is non-rotatably supported in alignment with the first section and operatively connected to the switch means, and means operatively connecting the first and second probe section for relative rotation therebetween.

9. A spindle assembly for a machine tool including a rotary spindle having tool holding means at one end and a cutting tool carried by said tool holding means, the spindle and tool holding means and tool having lengthwise passages extending therethrough, a probe element slidable in said passages and having one end extending outwardly of the outer end of the cutting tool, and switch means operatively connected to said probe element for operation thereby in response to relative axial movement between the tool and probe element, said probe element including a first section that rotates with the spindle and a second section which is non-rotatably supported in alignment with the first section and operatively connected to the switch means, and means operatively connecting the first and second probe section for relative rotation therebetween, said probe element including a third section disposed in said tool and detachable from said second section to facilitate replacement of the tool on the spindle.

10. The combination of claim 9 wherein said third section has a stop engageable with the tool holding means on the spindle to limit outward movement of the third section relative to the tool holding means and tool, said stop being adjustable in a direction longitudinally of the probe element.

11. A spindle assembly for a machine tool including a rotary spindle having tool holding means at one end and a cutting tool carried by said tool holding means, the spindle and tool holding means and tool having lengthwise passages extending therethrough, a probe element slidable in said passages and having one end extending outwardly of the outer end of the cutting tool, and switch means operatively connected to said probe element for operation thereby in response to relative axial movement between the tool and probe element, said probe element having a lengthwise passage extending through at least the portion in said cutting tool, and means for passing fluid through the passage in the probe element.

12. In a machine tool having a tool head, a tool holding spindle rotatably mounted in said head, means for rotating said spindle, and means for moving said spindle toward and away from a workpiece, means on said head defining an air chest, means for pressuring air in said air chest, a cutting tool carried by said spindle, said tool and spindle having lengthwise passages extending therethrough, a probe tube slidably disposed in said passages and having one end extending outwardly through the cutting tool, said probe tube defining a passageway extending from said air chest to said one end of the probe tube to direct air from the chest to the tip of the probe tube.

13. In a machine tool having a tool head, a tool holding spindle rotatably mounted in said head, means for rotating said spindle, and means for moving said spindle toward and away from a workpiece, means on said head defining an air chest, means for pressurizing air in said air chest, a cutting tool carried by said spindle, said tool and spindle having lengthwise passages extending therethrough a probe tube slidably disposed in said passages and having one end extending outwardly through the cutting tool, said probe tube defining a passageway extending from said air chest to said one end of the probe tube to direct air from the chest to the tip of the probe tube, and machine control means operated in response to relative axial movement between the tube and probe element.

14. In a machine tool having a tool head, a plurality of tool holding spindles rotatably mounted in said head, means for rotating said spindle, and means for moving said head along a path paralleling said spindles toward and away from a workpiece, means on said head defining an air chest, means for pressurizing the air in said air chest, a chamfering tool carried by each spindle, said chamfering tools and spindles having lengthwise passages therein, a probe tube slidably disposed in the passages of each spindle and tool assembly and having one end extending outwardly of the chamfering tool, said probe tubes each defining a passageway extending from said air chest to said one end of the respective tube, and switch means operatively connected to said probe tubes to be actuated in response to relative axial movement between the probe tubes and the tools.

References Cited by the Examiner
UNITED STATES PATENTS

| | | | |
|---|---|---|---|
| 1,807,126 | 5/1931 | Morrill et al. | 144—113 |
| 1,902,762 | 3/1933 | Conlon | 192—125 |
| 2,963,058 | 12/1960 | Carlson | 77—22 |
| 3,127,636 | 4/1964 | Heider | 264—329 |

FRANCIS S. HUSAR, *Primary Examiner.*